United States Patent
Kim et al.

(10) Patent No.: US 9,135,689 B2
(45) Date of Patent: Sep. 15, 2015

(54) APPARATUS AND METHOD FOR PERFORMING DETAIL ENHANCEMENT

(71) Applicant: SAMSUNG ELECTRONICS CO., LTD., Suwon-si (KR)

(72) Inventors: Jong-Man Kim, Gunpo-si (KR); Se-Hyeok Park, Seoul (KR); Hyun-Hee Park, Seoul (KR); Yong-Deok Kim, Seongnam-si (KR); Jong-Ho Kim, Seoul (KR); Byung-Seok Min, Seoul (KR); Jeong-Hoon Park, Seoul (KR); Min-Woo Lee, Yongin-si (KR); Ji-Young Yi, Seoul (KR); Jae-Hun Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 14/024,911

(22) Filed: Sep. 12, 2013

(65) Prior Publication Data

US 2014/0072218 A1   Mar. 13, 2014

(30) Foreign Application Priority Data

Sep. 12, 2012   (KR) .................. 10-2012-0100744

(51) Int. Cl.
| | | |
|---|---|---|
| G06K 9/00 | (2006.01) |
| G06K 9/40 | (2006.01) |
| G06T 5/40 | (2006.01) |
| H04N 5/14 | (2006.01) |
| H04N 1/58 | (2006.01) |
| H04N 1/407 | (2006.01) |
| G06T 5/00 | (2006.01) |
| G06T 5/20 | (2006.01) |

(52) U.S. Cl.
CPC . *G06T 5/40* (2013.01); *G06T 5/003* (2013.01); *H04N 1/4074* (2013.01); *H04N 1/58* (2013.01); *H04N 5/142* (2013.01); *G06T 5/20* (2013.01)

(58) Field of Classification Search
CPC .............. G06T 5/40; G06T 5/003; G06T 5/20; H04N 1/4074; H04N 5/142; H04N 1/58
USPC ................. 382/168, 170, 254, 266, 270, 274; 358/1.2, 520, 522, 3.27; 348/678
See application file for complete search history.

(56) References Cited

U.S. PATENT DOCUMENTS

| | | | | |
|---|---|---|---|---|
| 4,353,092 | A * | 10/1982 | Bailey et al. | 348/672 |
| 5,594,807 | A * | 1/1997 | Liu | 382/128 |
| 7,102,697 | B2 * | 9/2006 | Lei et al. | 348/678 |
| 7,809,208 | B2 | 10/2010 | Kang | |
| 8,339,518 | B2 * | 12/2012 | Kida et al. | 348/672 |
| 2011/0157436 | A1 | 6/2011 | Yin | |

* cited by examiner

*Primary Examiner* — Kanjibhai Patel
(74) *Attorney, Agent, or Firm* — Sughrue Mion, PLLC

(57) ABSTRACT

An apparatus and method are provided for performing detail enhancement. The apparatus includes an edge detector that detects an edge pixel from contents based on a luminance component of the contents, a histogram analyzer that generates at least one histogram with respect to the edge pixel and determines a gain variable value of the edge pixel based on the at least one histogram, and a gain regulator that determines a gain corresponding to the gain variable value of the edge pixel.

16 Claims, 6 Drawing Sheets

| 1 | 0 | -1 |
|---|---|---|
| 2 | 0 | -2 |
| 1 | 0 | -1 | x
(210)

| 1 | 2 | 1 |
|---|---|---|
| 0 | 0 | 0 |
| -1 | -2 | -1 | y
(220)

| 1 | -1 | 0 |
|---|---|---|
| 2 | -2 | 0 |
| 1 | -1 | 0 | xl
(230)

| 1 | 2 | 1 |
|---|---|---|
| -1 | -2 | -1 |
| 0 | 0 | 0 | yu
(240)

| 0 | 1 | -1 |
|---|---|---|
| 0 | 2 | -2 |
| 0 | 1 | -1 | xr
(250)

| 0 | 0 | 0 |
|---|---|---|
| 1 | 2 | 1 |
| -1 | -2 | -1 | yd
(260)

FIG.2

APPARATUS AND METHOD FOR PERFORMING DETAIL ENHANCEMENT

CROSS REFERENCE TO RELATED APPLICATION

This application priority from Korean Patent Application No. 10-2012-0100744 filed in the Korean Intellectual Property Office on Sep. 12, 2012, the entire disclosure of which is hereby incorporated by reference.

BACKGROUND

1. Field

Apparatuses and methods consistent with exemplary embodiments relate to performing detail enhancement, and more particularly, to performing detail enhancement, which can prevent side effects that may occur in detail enhancement.

2. Description of the Related Art

Display devices output images or text, and perform detail enhancement to provide clear images or text to users. Detail enhancement involves increasing or decreasing a value of a pixel according to a relationship with a neighboring pixel to increase a difference with the neighboring pixel. Since the neighboring pixel is referred to, local contrast is improved and an edge becomes clear, thus obtaining a clearer image.

However, detail enhancement may be accompanied by side effects such as aliasing in which a stair-step pattern appears as distinction in a diagonal direction becomes clear or halo in which a band-like edge appears due to overshoot or undershoot in a boundary.

SUMMARY

One or more exemplary embodiments provide an apparatus and method for performing detail enhancement for displayed contents.

One or more exemplary embodiments provide also an apparatus and method for performing detail enhancement, which can remove side effects that may occur in detail enhancement for displayed contents.

According to an aspect of an exemplary embodiment, there is provided an apparatus for performing detail enhancement. The apparatus includes an edge detector that detects an edge pixel from contents based on a luminance component of the contents; a histogram analyzer that generates at least one histogram with respect to the edge pixel and determines a gain variable value of the edge pixel based on the histogram; and a gain regulator that determines a gain corresponding to the gain variable value of the edge pixel.

According to an aspect of another exemplary embodiment, there is provided a method for performing detail enhancement. The method includes detecting an edge pixel from contents based on a luminance component of the contents; generating at least one histogram with respect to the edge pixel and determining a gain variable value of the edge pixel based on the at least on histogram; and determining a gain corresponding to the gain variable value of the edge pixel.

BRIEF DESCRIPTION OF THE DRAWINGS

The above and/or other aspects will be more apparent from the following detailed description taken in conjunction with the accompanying drawings, in which:

FIG. 2 is a diagram for describing an operation of an edge detector according to an exemplary embodiment;

DETAILED DESCRIPTION OF EXEMPLARY EMBODIMENTS

Hereinafter, exemplary embodiments will be described in detail with reference to the accompanying drawings. In addition, a detailed description of well-known functions and constructions will not be provided if they unnecessarily obscure the subject matter of the inventive concept.

Figure 1:
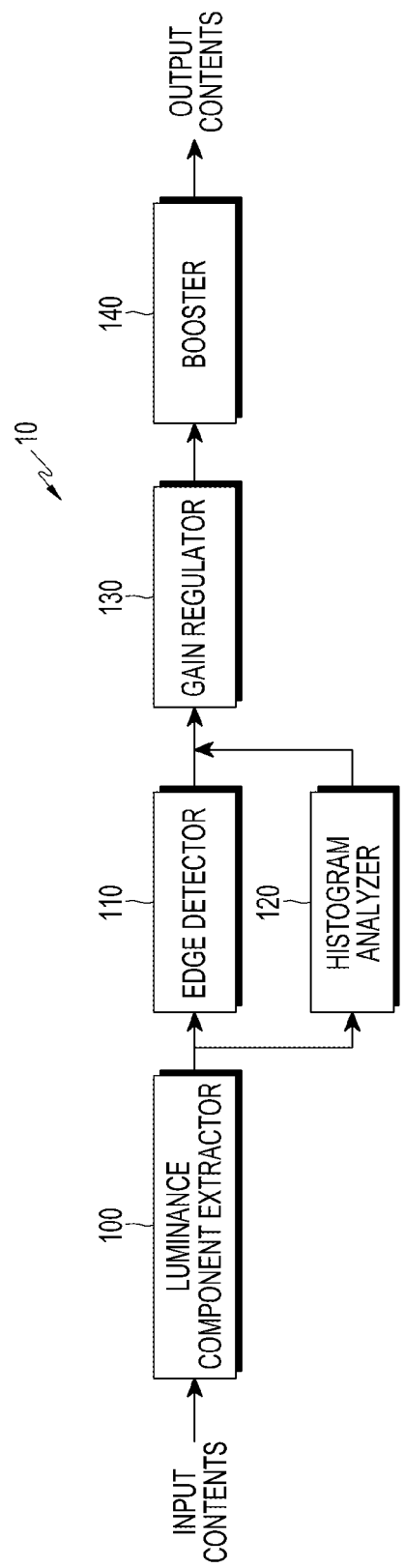
FIG. 1 is a block diagram showing a structure of an apparatus for performing detail enhancement according to an exemplary embodiment.

FIG. 1 is a block diagram of an apparatus 10 for performing detail enhancement (or a detail enhancement apparatus) according to an exemplary embodiment.

Referring to FIG. 1, the detail enhancement apparatus 10 may include a luminance component extractor 100, an edge detector 110, a histogram analyzer 120, and a gain regulator 130, and may further include a booster 140.

The luminance component extractor 100, upon input of contents such as an image or text, may extract a luminance component of the input contents frame-by-frame.

The edge detector 110 detects an edge from the input contents by using the extracted luminance component. Herein, an edge relates to a boundary between objects when an image includes a plurality of objects, and specifically refers to a portion at a point in which brightness changes from high to low or vice versa.

The histogram analyzer 120 calculates a gain variable value for a pixel corresponding to the edge (or an edge pixel) and generates a histogram considering neighboring pixels of the edge pixel to calculate the gain variable value.

The gain regulator 130 regulates a gain for each pixel, and in the exemplary embodiment, applies a nonlinear gain function to the edge pixel and applies a linear gain function or a predetermined gain to a pixel which does not correspond to the edge (or a non-edge pixel).

The booster 140 boosts the gain-applied contents and outputs the boosted contents, and if a luminance of the boosting result exceeds a maximum value, the booster 140 performs clipping to suppress excessive luminance enhancement, and considers boost values for neighboring pixels to prevent a discontinuous point from occurring due to an excessively high or low luminance of a particular pixel as compared to luminances of the neighboring pixels.

FIG. 2 is a diagram for describing an operation of the edge detector 110 according to an embodiment.

Referring to FIG. 2, the edge detector 110 uses an arbitrary mask to determine which pixel corresponds to an edge. For example, the edge detector 110 may use, as a 3×3 mask, an x-axis mask 210, a y-axis mask 220, an x-axis left mask 230, an y-axis up mask 240, an x-axis right mask 250, and an y-axis down mask 260. By overlaying the mask onto an image, a predetermined operation is performed, such that it is determined whether a pixel corresponds to an edge. Edge determination using the mask is well known and thus will not be described in detail herein.

Figure 3:
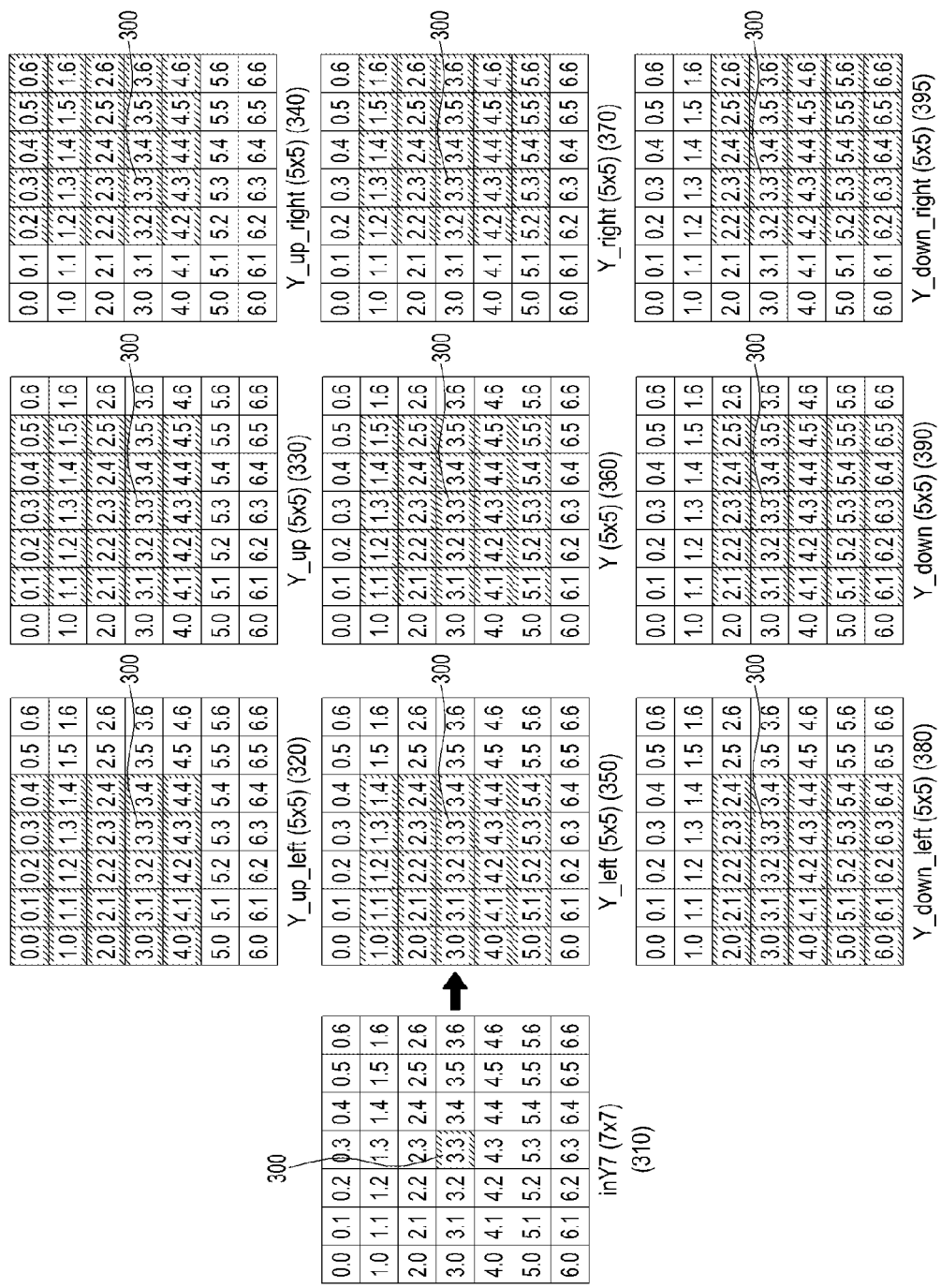
FIG. 3 is a diagram for describing calculation of a gain variable value of a pixel in a histogram analyzer according to an exemplary embodiment.

FIG. 3 is a diagram for describing calculation of a gain variable value of a pixel in the histogram analyzer 120 according to an embodiment.

In the exemplary embodiment, the histogram analyzer 120 calculates a gain variable value by using gray scales of neighboring pixels with respect to each edge pixel, and the gain regulator 130 determines a gain to be applied to each edge pixel, by using a nonlinear gain function.

Referring to FIG. 3, when a pixel 300 is determined to correspond to an edge, the histogram analyzer 120 determines a 7×7 local region 310 around the pixel 300, determines a 5×5 local region from the 7×7 local region 310, and then generates a histogram for the local region around the edge pixel 300 and a histogram for a peripheral region. This is intended to improve accuracy by considering a distribution of a region in which neighboring pixels exist, and in FIG. 3, in addition to a histogram for a center region 360, histograms for an y-axis up left region 320, an y-axis up region 330, an y-axis up right region 340, an y-axis left region 350, an y-axis right region 370, an y-axis down left region 380, an y-axis down region 390, and an y-axis down right region 395 are generated.

Herein, the 7×7 local region and the 5×5 local region may be changed arbitrarily, and nine histograms corresponding to nine directions may be generated.

Figure 4:
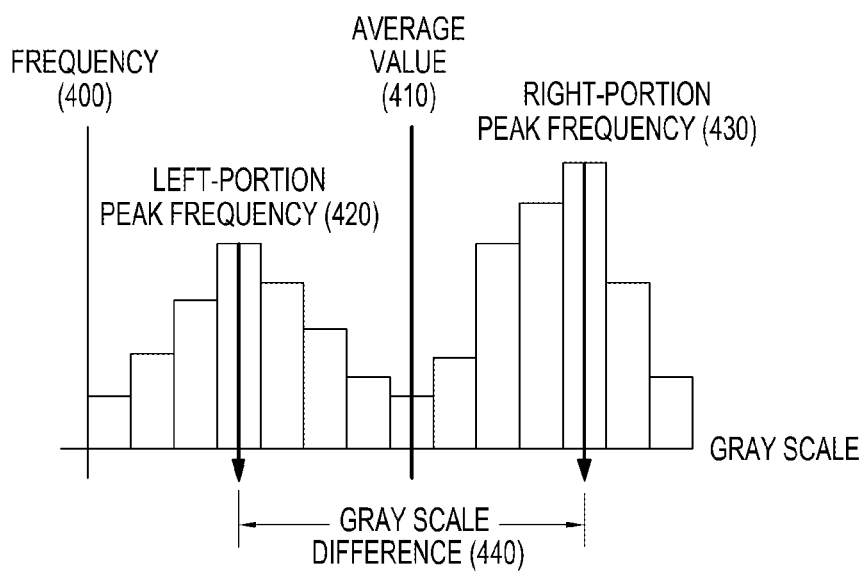
FIG. 4 is a diagram showing a histogram generated in the calculation described in FIG. 3.

FIG. 4 is a diagram showing a histogram generated as described in FIG. 3.

The histogram shown in FIG. 4 is any one of the nine histograms, in which a frequency 400 indicates the number of pixels corresponding to each gray scale value.

Referring to FIG. 4, since an average gray scale value 410 of pixels exists between the maximum gray scale value and the minimum gray scale value of the histogram, the histogram may be divided into a left portion and a right portion with respect to the average gray scale value 410, and a peak frequency 420 in the left portion and a peak frequency 430 in the right portion may be obtained. In this case, the high peak frequency means the uniform-luminance region, the low peak frequency means the various-luminance region, and as a gray scale difference 440 between the two peak frequencies 420 and 430 increases, a contrast increases. Therefore, a gain variable value of a pixel may be calculated using the peak frequencies 420 and 430 of the left portion and the right portion and the gray scale difference 440 between the two peak frequencies 420 and 430, for example, based on:

$$\text{Gain Vairable Value of Pixel} = \text{Peak\_N}_{Left} \times \text{Peak\_N}_{Right} \times \text{Peak\_Dis}$$

where $\text{Peak\_N}_{Left}$ indicates a peak frequency of the left portion, $\text{Peak\_N}_{Right}$ indicates a peak frequency of the right portion, and $\text{Peak\_Dis}$ indicates a gray scale difference between the peak frequency of the left portion and the peak frequency of the right portion.

The histogram analyzer 120 generates the histograms for the nine local regions with respect to the edge pixel, thus calculating eight gain variable values for the respective histograms and determining the maximum gain variable value among them as a gain variable value of the edge pixel.

Figure 5A:
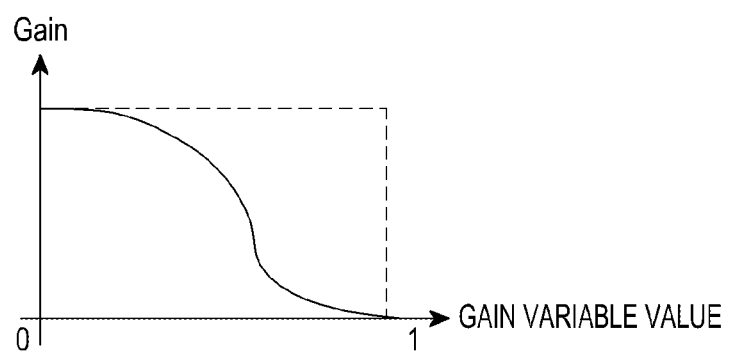
FIGS. 5A through 5C are diagrams for describing regulation of a gain of a pixel in a gain regulator according to an exemplary embodiment.
Figure 5B:
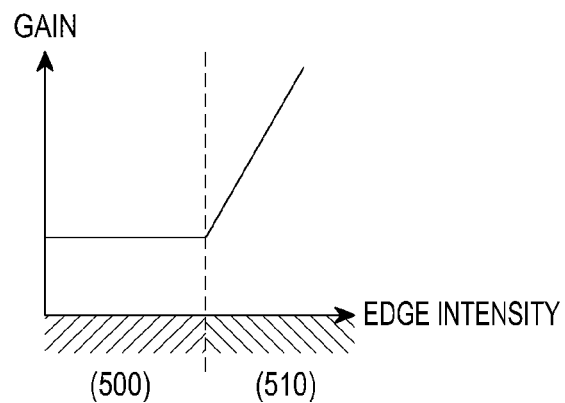
Figure 5C:
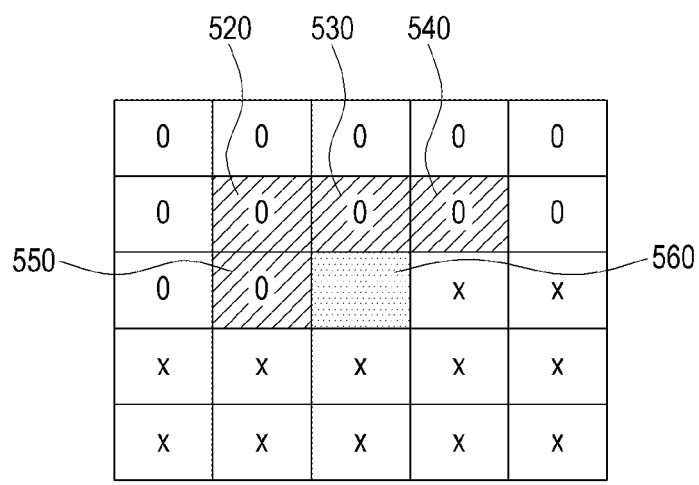

FIGS. 5A through 5C are diagrams for describing regulation of a gain of a pixel in the gain regulator 130 according to an embodiment.

Referring to FIG. 5A, the gain regulator 130 may regulate a gain by using a nonlinear gain function for an edge pixel. That is, by using a function which works nonlinearly according to a gain variable value of a pixel, a gain to be applied to the pixel may be regulated.

For a non-edge pixel, the gain regulator 130 may separately regulate a gain according to whether the pixel is in a region whose brightness is not changed, like a background, or the pixel is in a region whose brightness is changed, but does not correspond to an edge.

Referring to FIG. 5B, the gain regulator 130 may regulate a gain by applying a predetermined gain to a pixel 500 located in a region whose brightness is not changed, and a linear gain function to a pixel 510 which is located in a region whose brightness is changed, but does not correspond to an edge. In the linear gain function, a gain varies with an edge intensity of a pixel, and the edge intensity of the pixel may be determined when the edge detector 110 determines whether the pixel corresponds to an edge.

The gain regulator 130, when applying a gain determined by a gain function, to each pixel, may consider a gain applied to a neighboring pixel. For example, in FIG. 5C, when a gain is applied to a fifth pixel 560, the gain regulator 130 may apply a gain determined by a gain function, but may also apply to the fifth pixel 560, a gain regulated considering gains applied to a first pixel 520, a second pixel 530, a third pixel 540, and a fourth pixel 550. In FIG. 5C, 'O' indicates a gain-applied pixel and 'X' indicates a pixel to which a gain has not yet been applied.

Figure 6:
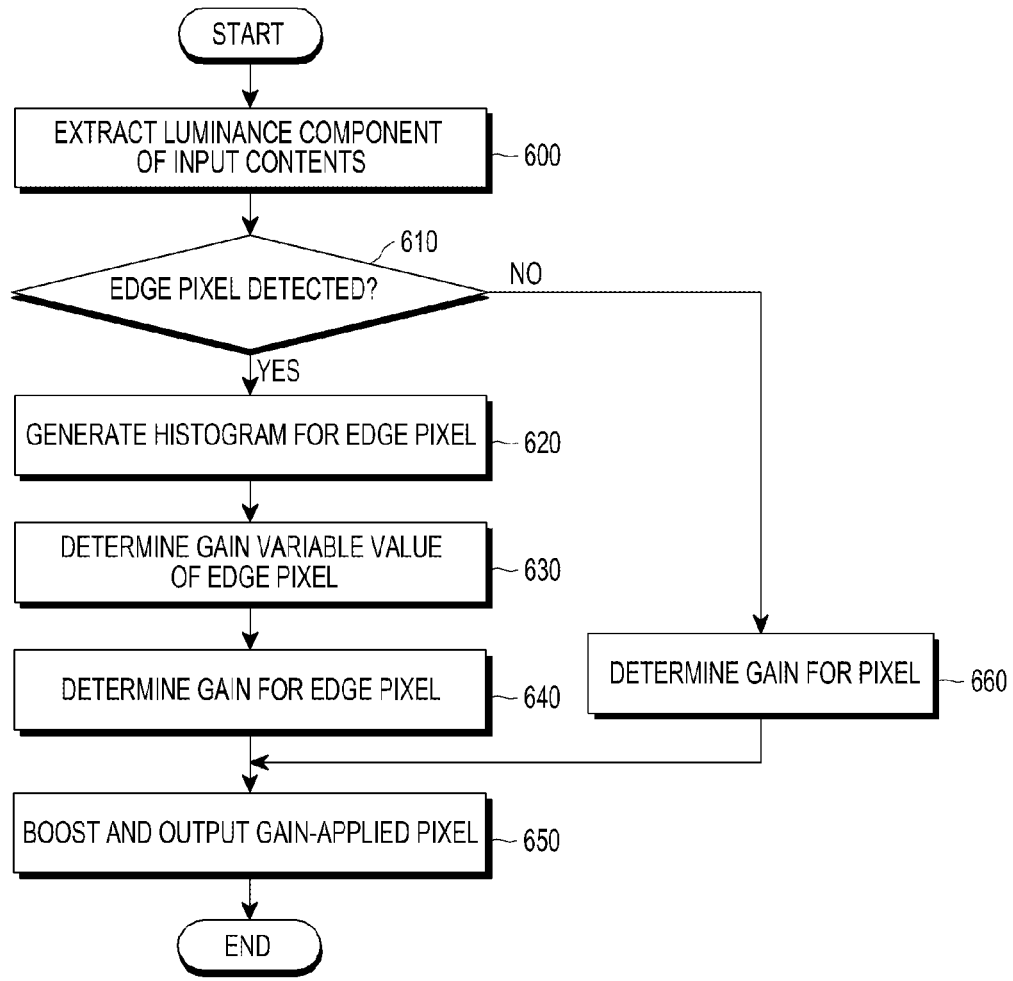
FIG. 6 is a flowchart of a method for performing detail enhancement according to an exemplary embodiment.

FIG. 6 is a flowchart for describing a method for performing detail enhancement according to an embodiment.

Referring to FIG. 6, after the luminance component extractor 100 extracts a luminance component of input contents in operation 600, the edge detector 110 detects an edge pixel and, if any edge pixel is detected ("YES" in operation 610), the histogram analyzer 120 generates a histogram for the edge pixel in operation 620 and determines a gain variable value of the edge pixel in operation 630. The histogram analyzer 120 generates a histogram for a local region around the edge pixel, as well as a histogram for a peripheral region, to determine the gain variable value. After the gain variable value of the edge pixel is determined, the gain regulator 130 determines a gain for the edge pixel by using a nonlinear gain function, and applies the gain to the edge pixel considering gains applied to neighboring pixels in operation 640.

If a pixel is determined not to be an edge pixel by the edge detector 110 ("NO" in operation 610), the gain regulator 130 determines a gain using a predetermined gain or a linear gain function and applies the gain to the pixel in operation 660. The booster 140 boosts and outputs the gain-applied pixel in operation 650 in such a way to prevent a discontinuous point by considering boosting applied to neighboring pixels.

As is apparent from the foregoing description of the exemplary embodiments, when detail enhancement is performed, a region which may have side effects is previously determined and a gain is regulated, thereby removing the side effects which may occur in detail enhancement.

Moreover, by considering gains applied to neighboring pixels in detail enhancement, generation of a discontinuous point may be suppressed.

While exemplary embodiments have been particularly shown and described, it will be understood by those of ordinary skill in the art that various modifications may be made therein without departing from the spirit and scope of the inventive concept as defined by the following claims.

Accordingly, the scope should be defined by the claims and equivalents thereof rather than by the described exemplary embodiments.

What is claimed is:

1. An apparatus for performing detail enhancement, the apparatus comprising:
    an edge detector that detects an edge pixel from contents based on a luminance component of the contents;

a histogram analyzer that generates at least one histogram with respect to the edge pixel and determines a gain variable value of the edge pixel based on the at least one histogram; and a gain regulator that determines a gain corresponding to the gain variable value of the edge pixel;

wherein the histogram analyzer generates a histogram with respect to a local region around the edge pixel and a histogram with respect to a peripheral region.

2. The apparatus of claim 1, further comprising:

a luminance component extractor that extracts the luminance component of the contents; and a booster that boosts the gain-applied edge pixel.

3. The apparatus of claim 1, wherein the histogram analyzer generates
histograms with respect to regions having a same size and different center pixels.

4. The apparatus of claim 1, wherein the histogram analyzer determines the gain variable value of the edge pixel based on peak frequencies of a left portion and a right portion of a histogram and a gray scale difference between the peak frequencies.

5. The apparatus of claim 1, wherein the histogram analyzer determines gain variable values of the edge pixel for a plurality of histograms, respectively, and determines a maximum value among the determined gain variable values as the gain variable value of the edge pixel.

6. The apparatus of claim 1, wherein the gain regulator determines the gain corresponding to the gain variable value of the edge pixel by using a nonlinear gain function.

7. The apparatus of claim 1, wherein the gain regulator applies a predetermined gain to a pixel located in a region whose brightness is not changed, and determines a gain by using a linear gain function for a pixel which is located in a region whose brightness is changed, but does not correspond to an edge.

8. The apparatus of claim 1, wherein the gain regulator, after determining the gain corresponding to the gain variable value of the edge pixel, regulates the determined gain based on a gain applied to a neighboring pixel of the edge pixel and applies the regulated gain to the edge pixel.

9. A method for performing detail enhancement, the method comprising:

detecting, by an edge detector, an edge pixel from contents based on a luminance component of the contents;

generating, by a histogram analyzer, at least one histogram with respect to the edge pixel and determining a gain variable value of the edge pixel based on the at least one histogram; and determining, by a gain regulator, a gain corresponding to the gain variable value of the edge pixel;

wherein the determining the gain variable value of the edge pixel comprises generating a histogram with respect to a local region around the edge pixel and a histogram with respect to a peripheral region.

10. The method of claim 9, further comprising: extracting the luminance component of the contents; and boosting the gain-applied edge pixel.

11. The method of claim 9, wherein the determining the variable of the edge pixel comprises generating histograms with respect to regions having a same size and different center pixels.

12. The method of claim 9, wherein the determining the variable of the edge pixel comprises determining the gain variable value of the edge pixel by using peak frequencies of a left portion and a right portion of a histogram and a gray scale difference between the peak frequencies.

13. The method of claim 9, wherein the determining the variable of the edge pixel comprises determining gain variable values of the edge pixel for a plurality of histograms, respectively, and determining a maximum value among the determined gain variable values as the gain variable value of the edge pixel.

14. The method of claim 9, wherein the determining the gain comprises determining the gain corresponding to the gain variable value of the edge pixel by using a nonlinear gain function.

15. The method of claim 9, wherein the determining the gain comprises applying a predetermined gain to a pixel located in a region whose brightness is not changed, and determining a gain by using a linear gain function for a pixel which is located in a region whose brightness is changed, but does not correspond to an edge.

16. The method of claim 9, wherein the determining the gain comprises after determining the gain corresponding to the gain variable value of the edge pixel, regulating the determined gain based on a gain applied to a neighboring pixel of the edge pixel and applying the regulated gain to the edge pixel.

* * * * *